United States Patent
Zimmerman et al.

(10) Patent No.: US 7,693,771 B1
(45) Date of Patent: Apr. 6, 2010

(54) METHOD AND APPARATUS FOR IDENTIFYING RECURRING PAYMENTS

(75) Inventors: Jeffrey Zimmerman, Menlo Park, CA (US); JWM Spies, San Mateo, CA (US); Craig La Salle, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 606 days.

(21) Appl. No.: 11/404,973

(22) Filed: Apr. 14, 2006

(51) Int. Cl.
*G06Q 40/00* (2006.01)
(52) U.S. Cl. .......................... 705/36; 705/37
(58) Field of Classification Search ............ 705/36–37, 705/40
See application file for complete search history.

(56) References Cited

U.S. PATENT DOCUMENTS

2005/0222952 A1 * 10/2005 Garrett et al. ................ 705/40
2007/0083397 A1 * 4/2007 Bryan ........................... 705/4

* cited by examiner

*Primary Examiner*—Thu Thao Havan
(74) *Attorney, Agent, or Firm*—Gunnison, McKay & Hodgson, L.L.P.; Philip J. McKay

(57) ABSTRACT

A method and apparatus for identifying recurring payments analyzes historical transactions from a predefined time period to identify potential recurring payments and payees, based on one or more potential recurring payment identification parameters. Once potential recurring payments are identified by analyzing the historical transaction data, the user is presented with potential recurring payments report including a list of the potential recurring payments. In one embodiment, the user is given the opportunity to designate a given potential recurring payment as a confirmed recurring payment. Once a potential recurring payment is confirmed as a recurring payment, the data associated with that recurring payment, such as payee, account number, routing/address, payment amount, and date of payment is saved and the user has the opportunity to set up automatic payment of the recurring payment at a selected interval or to have the recurring payment appear as a payment option at a time selected interval.

32 Claims, 6 Drawing Sheets

METHOD AND APPARATUS FOR IDENTIFYING RECURRING PAYMENTS

BACKGROUND OF THE INVENTION

Currently, computer implemented financial management systems provide a centralized interface with banks, and other various financial institutions, for electronically tracking financial transactions to allow a user to, for example, balance checkbooks, pay bills, track expenditures, and create and manage budgets. These computer implemented financial management systems have enjoyed increased popularity as their capability has increased and the complexity of the average households, or small businesses, finances have also increased.

Currently, some computer implemented financial management systems allow a user to track the nature of financial transactions, whether the transaction involved using checks, cash, credit cards, or electronic payment, and categorize each transaction as a particular type of income or expense. For example, with some computer implemented financial management systems currently in use, a user may track the amount of money he or she spends on taxes, clothing, dining out, utilities, mortgage, rent, etc., by assigning an appropriate category to each transaction. In some instances the appropriate category is assigned automatically by the computer implemented financial management system, in others, the appropriate category is assigned manually by the user. The user may then have the computer implemented financial management system pay his or her bills and/or generate reports periodically to determine the amounts spent in each category. Many users find this feature extremely helpful for ensuring bills are paid, preparing tax returns, and/or keeping within a budget.

As noted above, computer implemented financial management systems have enjoyed a tremendous increase in popularity. However, experience has shown that an average user is far more likely to adopt, and continue to use, a computer implemented financial management system if the amount of manual data entry, i.e., data entry made via any user interface device, such as a keyboard, a mouse, a touch pad, or any other device that requires input from the user, is minimized. Consequently, it is desirable to eliminate as much manual data entry required of a user to either use, or set up, a computer implemented financial management system, as is possible.

One feature of some financial management systems that currently requires considerable manual input on the part of the user is identifying and scheduling a recurring payment. Once a recurring payment is identified and established, a user can schedule an automatic payment of the recurring payment, or a reminder regarding the recurring payment, at regular intervals, without further user input or thought.

Currently, recurring payments must first be identified as such, typically manually by the user, and then, for each recurring payment, the user must enter the data regarding the recurring payment, such as payee, account number, routing/address, payment amount, and date of payment, manually, i.e., using an interface device as described above. For the average household, or small business, this is a non-trivial task. Consequently, many users of current computer implemented financial management systems find this start-up process too time consuming and labor intensive and, in the interest of "saving time", albeit in the short term, forgo setting up a recurring payment system, thereby leaving this potentially valuable feature unused. In addition, many potential users of current computer implemented financial management system never adopt, or buy, a current computer implemented financial management system because of the perceived difficulty of the start up process, i.e. the amount of data, such the recurring payment data discussed above, that must be entered to make full use of a current computer implemented financial management system.

SUMMARY OF THE INVENTION

In accordance with one embodiment, a method and apparatus for identifying recurring payments obtains historical payment data from a selected time period to identify potential recurring payments based on one or more potential recurring payment identification parameters such as: payment amount, within specified limits; payment date, within specified limits; payee; and/or the category of the payment transaction or other payment parameter that could be used to identify a potential recurring payment.

In one embodiment, once potential recurring payments are identified by analyzing historical payment data, the user is presented with a potential recurring payments report including a display of the potential recurring payments and, in one embodiment, the user is given the opportunity to designate a given potential recurring payment as a confirmed, or valid, recurring payment. Once a potential recurring payment is confirmed as a valid recurring payment, the data associated with that recurring payment, such as the payee, the account number, the routing/address of the payee, payment amount, and date of payment, is saved and the user has the opportunity to set up automatic payment of the recurring payment at a selected interval, or, in one embodiment, to have the recurring payment appear as a reminder or payment option at a selected interval, such as monthly.

Embodiments of the method and apparatus for identifying recurring payments described herein, allow a user to identify recurring payments easily and to minimize his or her need to manually identify and enter recurring payment data into a parent computer implemented financial management system, thereby making it easier to start to use, and continue to use, a computer implemented financial management system incorporating the method and apparatus for identifying recurring payments described herein.

Embodiments are best understood by reference to the following detailed description when read in conjunction with the accompanying drawings.

Figure 1:
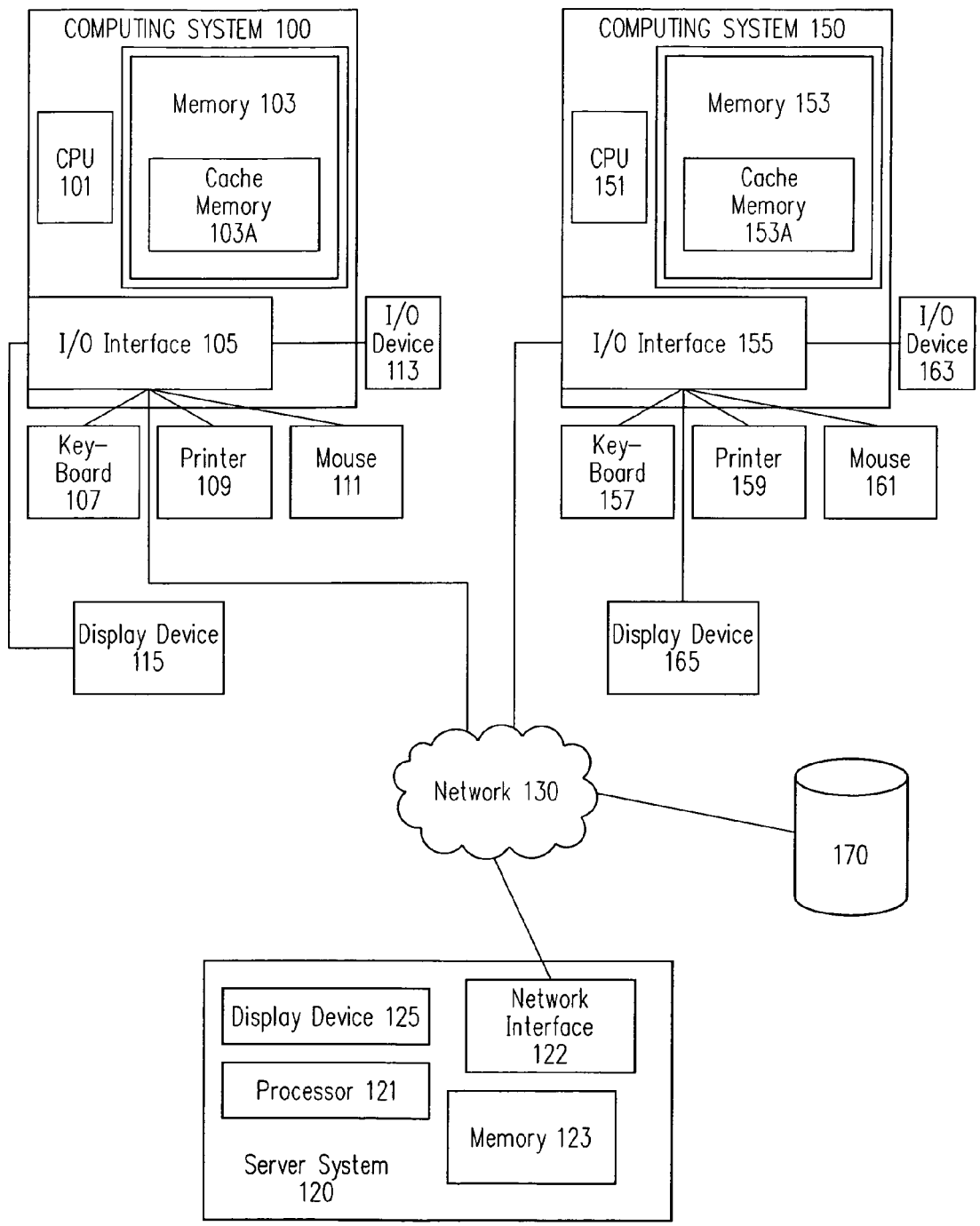
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are merely examples and that other architectures, modes of operation, orders of operation and elements/functions can be provided and implemented without departing from the essential characteristics and features of the invention.

In particular, screenshots and user interface elements shown in the FIG.s are merely exemplary; other layouts, arrangements, formats, and user interface features may be provided without departing from the essential characteristics of the invention as claimed.

DETAILED DESCRIPTION

The present invention will now be discussed with reference to the accompanying FIG.s, which depict one or more exemplary embodiments of the invention. The invention may be embodied in many different forms and should not be construed as limited to the embodiments set forth herein, shown in the FIG.s, and/or described below and the invention is only limited by the language of the claims. Rather, these exemplary embodiments are provided to allow a complete disclosure that conveys the principles of the invention to those of skill in the art.

Embodiments of the method and apparatus for identifying recurring payments described herein, allow a user to identify recurring payments easily and to minimize his or her need to manually identify and enter recurring payment data into a parent computer implemented financial management system, thereby making it easier to start to use, and continue to use, a computer implemented financial management system incorporating the method and apparatus for identifying recurring payments described herein.

In accordance with one embodiment, a method and apparatus for identifying recurring payments (200 in FIG. 2A) obtains historical payment data from a selected time period (207 IN FIG. 2A) to identify potential recurring payments (209 in FIG. 2A) based on one or more potential recurring payment identification parameters such as: payment amount, within specified limits; payment date, within specified limits; payee; and/or the category of the payment transaction or other payment parameter that could be used to identify a potential recurring payment.

Figure 2A:
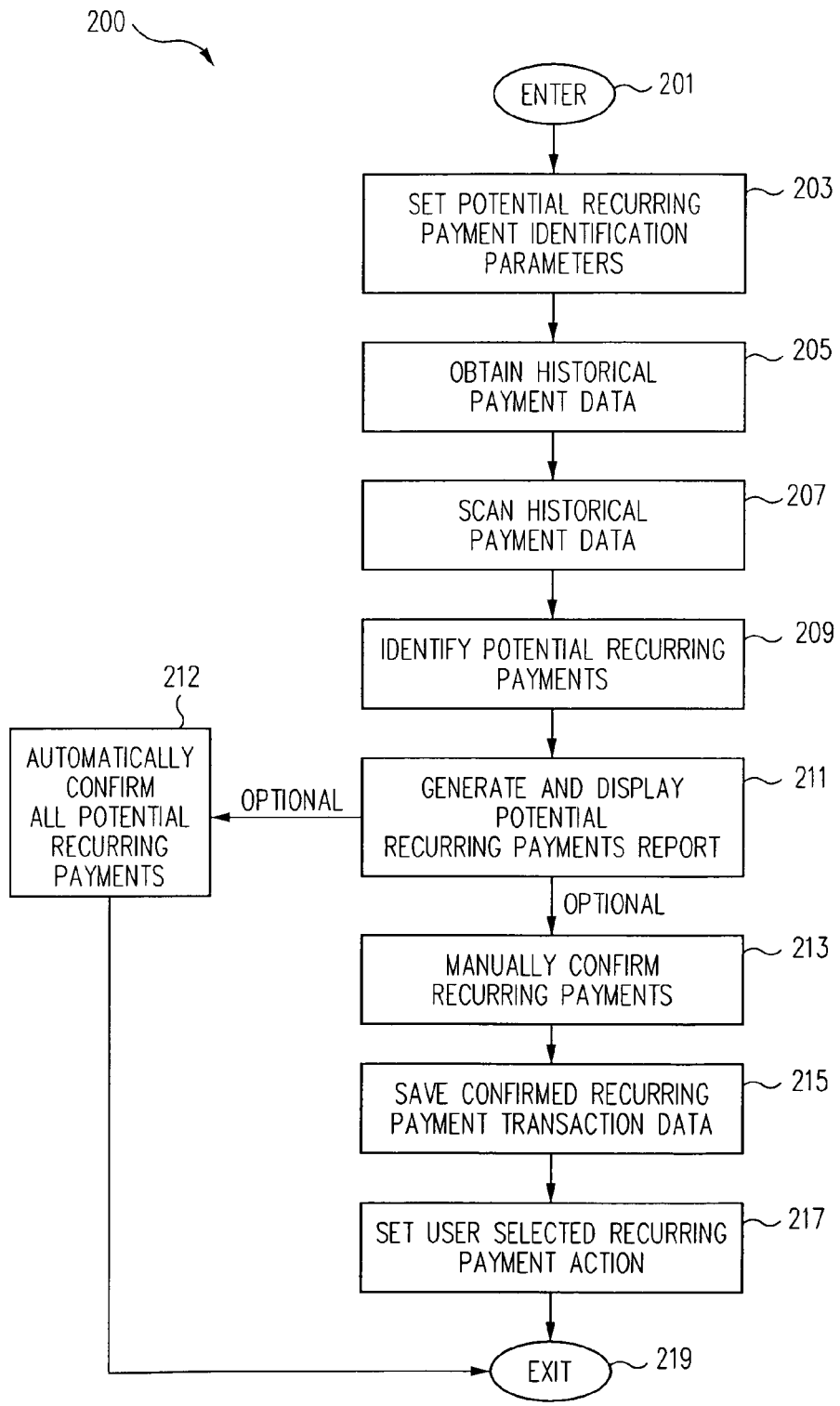
FIG. 2A is a flowchart depicting a process for identifying recurring payments according to one embodiment.
Figure 2B:
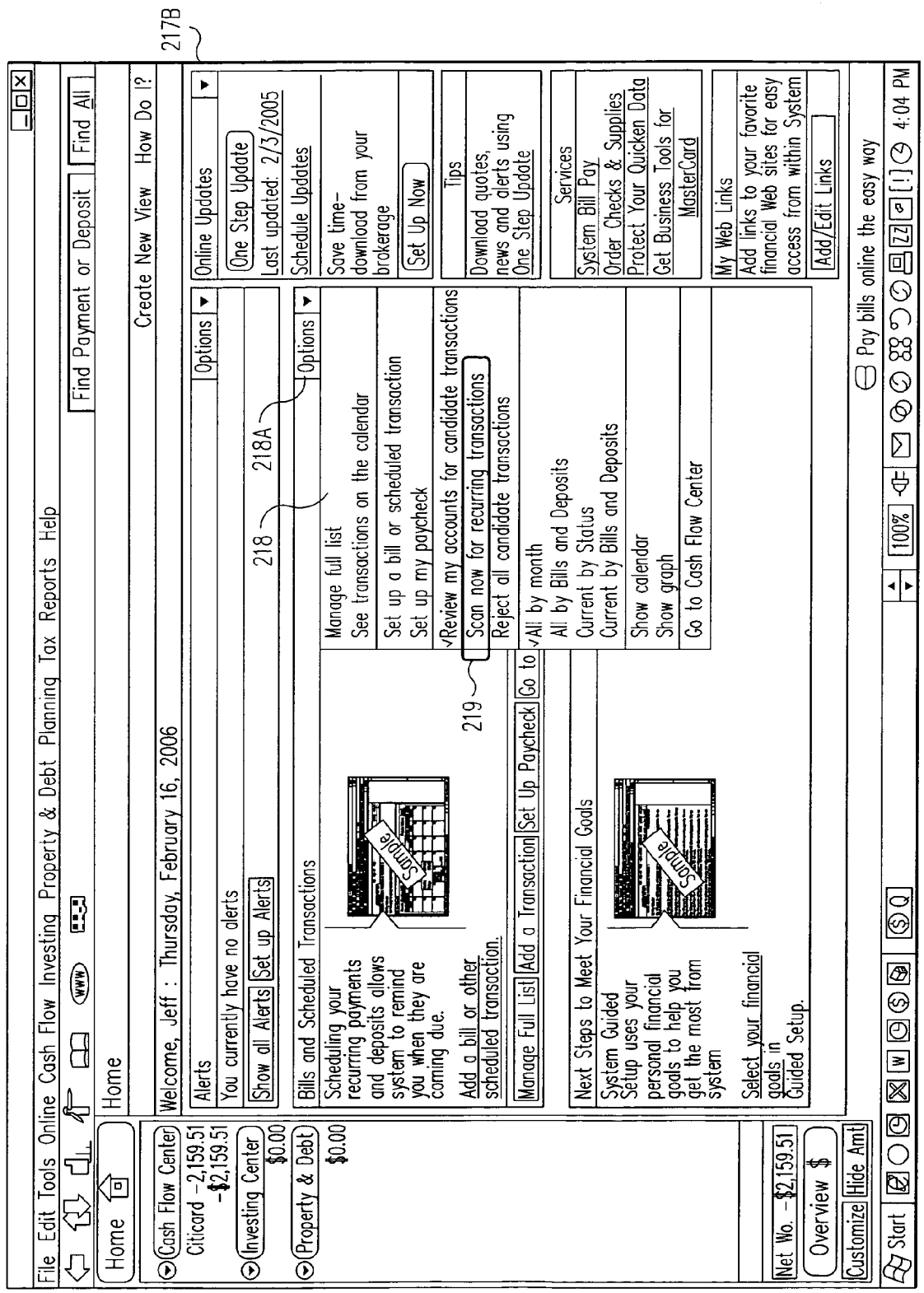
FIGS. 2B and 2C are user interface screenshots illustrating one embodiment of the displays associated with a process for identifying recurring payments according to one embodiment.
Figure 2C:
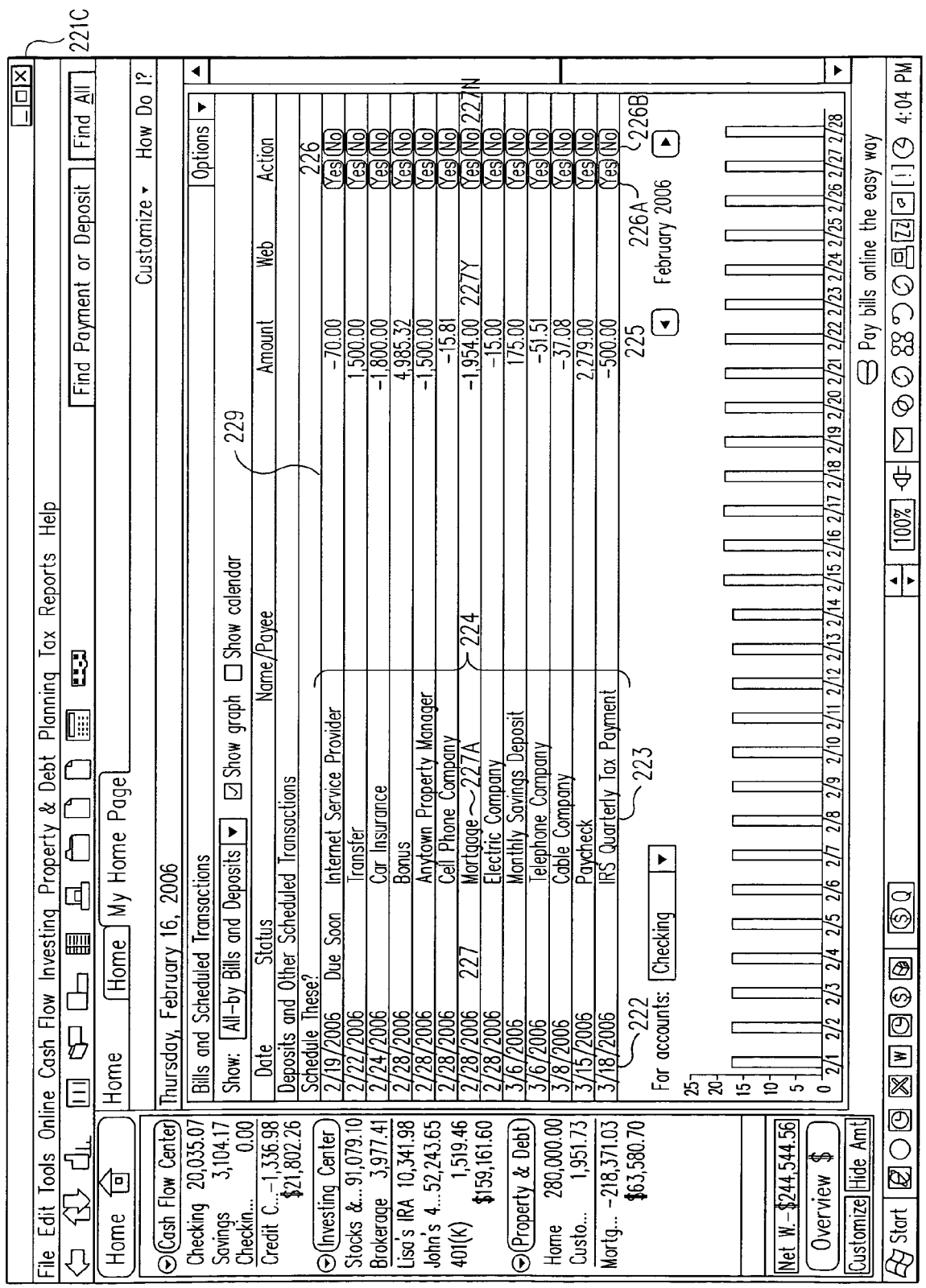

In one embodiment, once potential recurring payments are identified by analyzing historical payment data, the user is presented with a potential recurring payments report (211 in FIG. 2A, 229 in FIG. 2C) including a display of the potential recurring payments (224 in FIG. 2C) and, in one embodiment, the user is given the opportunity to designate a given potential recurring payment as a confirmed, or validated, recurring payment (213 in FIG. 2A, 226 in FIG. 2C). In one embodiment, once a potential recurring payment is confirmed as a valid recurring payment, the data associated with that recurring payment, such as the payee, the account number, the routing/address of the payee, payment amount, and date of payment is saved (215 in FIG. 2A) and the user has the opportunity to set up automatic payment of the recurring payment at a selected interval, or, in one embodiment, to have the recurring payment appear as a reminder or payment option at a selected interval, such as monthly 212, 217 in FIG. 2A).

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system. In addition, as described more fully below, embodiments can be implemented on computing systems other than a conventional computing system such as, for example, a personal digital assistant, a cell phone, or other computing system capable of processing computer readable data. Computing systems also include those in which one or more computing resources (hardware or software) are located remotely and accessed via a network, such as a Local Area Network (LAN), a Wide Area Network (WAN), a public network such as the Internet, a private network, or other electronic medium in which data may be exchanged between one computing system and one or more other computing system(s). Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the method and apparatus for identifying recurring payments described herein makes use of input provided to the computer device implementing the process for identifying recurring payments described herein via user interface devices such as a keyboard, mouse, touchpad, or any other device capable of providing user input to a computing system or for translating user actions into computing system operations.

In one embodiment, described herein for illustrative purposes, the process for identifying recurring payments described herein is implemented in a personal financial system, package, program, or application in which the system, package, program, or application tracks user payment transactions. It will be appreciated by those of skill in the art that such an embodiment is merely exemplary, and the present invention, far from being limited to use in a personal financial system, package, program, or application, can be used to enhance the budgeting capabilities of software systems, packages, programs, or applications in a multitude of domains, including business financial management systems and Tax preparation systems and web pages, web sites and web-based systems.

Hardware System Architecture

More particularly, FIG. 1 is a block diagram of an exemplary hardware architecture for implementing one embodiment of a process for identifying recurring payments, such as process for identifying recurring payments 200, discussed below, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input output (I/O) interface 105, and a memory system 103, including cache memory 103A. Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of, inputting data to, and outputting data from, computing system 100. As discussed in more detail below, in one embodiment, a process for identifying recurring payments, such as process for identifying recurring payments 200, discussed below, can be loaded, in whole, or in part, into computing system 100 via I/O device 113, such as from a CD, DVD or floppy disk containing all, or part, of a process for identifying recurring payments, such as process for identifying recurring payments 200, discussed below.

Similarly, computing system 150 typically includes a central processing unit (CPU) 151, hereinafter processor 151, an input output (I/O) interface 155, and a memory system 153, including cache memory 153A. Like computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150. As discussed in more detail below, in one embodiment, a process for identifying recurring payments, such as process for identifying recurring payments 200, discussed below, can be loaded, in whole, or in part, into computing system 150 via I/O device 163, such as from a CD, DVD or floppy disk containing all, or part, of a process for identifying recurring payments, such as process for identifying recurring payments 200, discussed below.

Also shown in FIG. 1 is database 170. In one embodiment, database 170 is a designated server system or computing system, or a designated portion of a server system or computing system, such as systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for identifying recurring payments, such as process for identifying recurring payments 200, discussed below, is stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for identifying recurring payments, such as process for identifying recurring payments 200, discussed below, is stored in whole, or in part, in server system 120.

Network 130 can be any network or network system that is of interest to a user such as a Local Area Network (LAN), a Wide Area Network (WAN), a public network such as the Internet, a private network, or other network capable of allowing communication between two or more computing systems. In various embodiments, server system network interface 122 and I/O interfaces 105 and 155 include analog modems, digital modems, a network interface card, a broadband connection, or any other means for communicably coupling computing systems 100 and 150, and database 170, and server system 120 via network 130.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via a network. In addition, the particular type of, and configuration of, computing systems 100 and 150, database 170, and server system 120 are not essential to the present invention.

As discussed in more detail below, in one embodiment, a process for identifying recurring payments, such as process for identifying recurring payments 200, discussed below, is stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for identifying recurring payments, such as process for identifying recurring payments 200, discussed below, is sometimes referred to herein, alternatively, as an application, a program, a component of a software system, or a component of a software package, or a component of a parent system, this terminology is illustrative only. In some embodiments, a process for identifying recurring payments, such as process for identifying recurring payments 200, discussed below, is capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processors 101 and 151, or server system processor 121. In one embodiment, execution of a process for identifying recurring payments, such as process for identifying recurring payments 200, discussed below, by processor 101, processor 151, or server system processor 121, results in the operations of an agent computer process (not shown) and/or a rule computer process (not shown).

In one embodiment, a process for identifying recurring payments, such as process for identifying recurring payments 200, discussed below, is a computer application or process implemented and/or run and/or stored, in full, or in part, in, or on, a computer program product. Herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or methods capable of delivering computer readable data representing computer readable code. This medium may belong to a computing system, such as computing systems 100 and 150 of FIG. 1, described above. However, the medium also may be removed from the computing system.

For example, all, or part, of a process for identifying recurring payments, such as process for identifying recurring payments 200, discussed below, may be stored in a memory that is physically located in a location, such as server system memory 123, or database 170, of FIG. 1, different from a computing system, such as computing systems 100 and/or 150 of FIG. 1, utilizing a process for identifying recurring payments, such as process for identifying recurring payments 200, discussed below. In one embodiment, all, or part, of a process for identifying recurring payments, such as process for identifying recurring payments 200, discussed below, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via a connection to another computer, such as computing systems 100, 150 of FIG. 1, via modems and analog lines, digital interfaces and a digital carrier line, or wireless or cellular connections.

In one embodiment, the computing systems and/or server system running and/or utilizing and/or storing all, or part, of a process for identifying recurring payments, such as process for identifying recurring payments 200, discussed below, such as computing systems 100 and/or 150 and/or server system 120 of FIG. 1, is a portable computer, a workstation, a two-way pager, a cellular telephone, a smart phone, a digital wireless telephone, a personal digital assistant, a server computer, an Internet appliance, or any other device that includes components that can execute all, or part, of a process for identifying recurring payments, such as process for identifying recurring payments 200, discussed below, in accordance with at least one of the embodiments as described herein. Similarly, in another embodiment, a process for identifying recurring payments, such as process for identifying recurring payments 200, discussed below, is implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the methods as described herein.

Process

FIG. 2A is a flowchart depicting a process for identifying recurring payments 200 according to one embodiment. Process for identifying recurring payments 200 begins at ENTER OPERATION 201. From ENTER OPERATION 201, process flow proceeds to SET POTENTIAL RECURRING PAYMENT IDENTIFICATION PARAMETERS OPERATION 203.

At SET POTENTIAL RECURRING PAYMENT IDENTIFICATION PARAMETERS OPERATION 203, the parameters that will be used for potential recurring payment identification also referred to herein as potential recurring payment identification parameters, are established. In one embodiment, the potential recurring payment identification parameters include: multiple, i.e., two or more, occurrences of payments to the same payee in a given time period; multiple occurrences of the same payment amount in a given time period; any payment that is made at relatively regular time intervals, such as the 15$^{th}$ of each month; any payment made in selected categories, such as might be assigned by a parent system, as defined below; or, in one embodiment, any specified merchants or service providers can be pre-programmed, or user modified/entered, as a potential recurring payment identification parameter.

As discussed in more detail below, in some embodiments, some, or all, of the potential recurring payment identification parameters also include limits that create a potential recurring payment identification parameter window so that minor variations in any of the potential recurring payment identification parameters of a given potentially recurring payment, such as minor fluctuations in a cable bill or a heating bill amount, or payment date, do not cause these potentially recurring payments to be overlooked.

In one embodiment, process for identifying recurring payments 200 is part of a personal financial, business financial, accounting, or tax preparation software system, program, package or application that implements a method or process for identifying recurring payments, such as process for identifying recurring payments 200, as one of multiple features offered. Herein, a personal financial, business financial, accounting, or tax preparation software system, program, package or application implementing a method or process for identifying recurring payments, such as process for identifying recurring payments 200, is also referred to as a "parent system".

Herein, anyone interfacing with, or otherwise using, or interacting, directly or indirectly, with a parent system and/or a method or process for identifying recurring payments, such as process for identifying recurring payments 200, is also referred to as a "user".

In particular, as noted above, in one embodiment, multiple occurrences of the same payee in a given time period is used as one potential recurring payment identification parameter. In one embodiment, a user, or the provider of process for identifying recurring payments 200, or the provider of a parent system, can further select how many occurrences, i.e., two, three, four, etc., are sufficient to trigger a designation of the multiple payments as a potential recurring payment.

As noted above, in one embodiment, multiple occurrences of the same payment amount in a given time period is used as one potential recurring payment identification parameter. In one embodiment, a user, or the provider of process for identifying recurring payments 200, or the provider of a parent system, can further select how many occurrences, i.e., two, three, four, etc., are sufficient to trigger a designation of the multiple payments as a potential recurring payment. In addition, in one embodiment, a user, or provider of process for identifying recurring payments 200, or provider of a parent system, can create a potential recurring payment identification parameter window by setting limits on the variation of the payment amount and allowing any payments made within these limits to qualify as one of the occurrences to trigger a designation of multiple payments as a potential recurring payment. In this way minor fluctuations in payment amount will not cause an otherwise potential recurring payment to be overlooked.

As an example, a limit of +/− a dollar amount or +/− a percentage of a baseline total payment can be used to create a qualifying potential recurring payment identification parameter window. This is an effective tool for use with usage variable bills such cable bills, where pay-per-view viewing can cause fluctuations in the monthly bill, or heating bills that can vary based on usage and season, but nevertheless are typically recurring payments.

As noted above, in one embodiment, multiple occurrences of any payment at relatively regular time intervals, such as the 15$^{th}$ of each month, in a given time period is used as one potential recurring payment identification parameter. In one embodiment, a user, or the provider of process for identifying recurring payments 200, or the provider of a parent system, can further select how many occurrences, i.e., two, three, four, etc., are sufficient to trigger a designation of the multiple payments as a potential recurring payment. In addition, in one embodiment, a user, or provider of process for identifying recurring payments 200, or provider of a parent system, can create a potential recurring payment identification parameter window by setting limits on the variation of the payment date and allowing any payments made within these limits to qualify as one of the occurrences to trigger a designation of multiple payments as a potential recurring payment. In this way, minor fluctuations in payment date caused by the payment date falling on a weekend or holiday, or a variation in payment date for any reason, will not cause an otherwise potential recurring payment to be overlooked.

As noted above, in one embodiment, any payment made in selected categories, such as assigned by a user or a parent system, is used as one potential recurring payment identification parameter. As noted above, in one embodiment, process for identifying recurring payments 200 is part of a parent personal financial, business financial, accounting, or tax preparation, software system, program, package or application that implements a process for identifying recurring payments, such as process for identifying recurring payments 200, as one of multiple features. Some of these parent systems, such as Quicken® and TurboTax®, both available from Intuit Inc., of Mountain View Calif., include the ability to automatically classify transactions, including payments, into categories. In embodiments where process for identifying recurring payments 200 is used with these parent systems, the user, or the provider of the parent system, can choose any payments in selected categories, such as utilities, cable, Internet access, credit cards, mortgage, etc. to be automatically designated as potential recurring payments.

As noted above, in one embodiment, any payments to specified merchants or service providers can be pre-programmed as potential recurring payment identification parameters. This is very similar to the payment made in selected parent system categories option described above. However, in this embodiment, instead of relying on a parent system to categorize payments, the payee itself is used to identify any payments to that payee, such as PG+E, Comcast Cable, AOL Internet access, Visa, Washington Mutual, etc. as potential recurring payments.

In one embodiment, any combination of the potential recurring payment identification parameters discussed above can be made to create a specific potential recurring payment identification parameters set to be used with a particular embodiment of process for identifying recurring payments 200. By combining multiple potential recurring payment identification parameters into potential recurring payment identification parameters sets, the likelihood of the designated potential recurring payments actually being valid recurring payments is greatly increased. As an example, one effective potential recurring payment identification parameters set would include not only the multiple occurrences of the same payee within a specified period potential recurring payment identification parameter, but also the multiple occurrences of the same payment amount in the given time period potential recurring payment identification parameter. Then if these two potential recurring payment identification parameters were combined with the multiple occurrences of any payment at relatively regular time intervals potential recurring payment identification parameter, it is fairly certain that any multiple payments satisfying all three of these potential recurring payment identification parameters are indeed valid recurring payments.

In one embodiment, the potential recurring payment identification parameters are established by the providers/manufactures of process for identifying recurring payments 200, or the provider of the parent system, with, in one embodiment, a user input capability that allows the user to modify, add, or delete the potential recurring payment identification parameters.

In one embodiment, the data establishing the potential recurring payment identification parameters, and their associated data such as limits and specific values, is stored at SET POTENTIAL RECURRING PAYMENT IDENTIFICATION PARAMETERS OPERATION 203. In one embodiment, the data is saved by storing the data, in whole, or in part, by any one of the numerous mechanisms known to those of skill in the art. For instance, in one embodiment, the data, in whole, or in part, is stored in a memory system, such as memory systems 103, 153, or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Once the desired potential recurring payment identification parameters are established and stored at SET POTENTIAL RECURRING PAYMENT IDENTIFICATION PARAMETERS OPERATION 203, process flow proceeds to OBTAIN HISTORICAL PAYMENT DATA OPERATION 205. At OBTAIN HISTORICAL PAYMENT DATA OPERATION 205 historical payment data for the user is obtained, typically in electronic format, by one of numerous methods known to those of skill in the art.

In one embodiment, the historical payment data is obtained from a financial institution, such as a bank or credit union, using the Open Financial Exchange (OFX) specification. OFX is a specification for the electronic exchange of financial data between financial institutions, businesses, consumers, and other users and user processes, such as process for identifying recurring payments 200, or a parent system implementing process for identifying recurring payments 200, via the Internet. OFX was created in early 1997 and is well known to those of skill in the art. OFX supports a wide range of financial activities including consumer and small business banking, consumer and small business bill payment, bill presentment, payment history displays, and investments tracking, including stocks, bonds, mutual funds, 401(k), and bank account details. OFX enables transactional, permissive, data feed driven Web sites, such as bank websites, thin clients, and financial software systems, to operate and communicate, easily, seamlessly and securely. Consequently, in one embodiment, using OFX, historical payment data can be made readily available to process for identifying recurring payments 200 and/or a parent system implementing process for identifying recurring payments 200 at OBTAIN HISTORICAL PAYMENT DATA OPERATION 205.

As noted, the OFX specification is well known to those of skill in the art and is publicly available for implementation by any financial institution or vendor. As of March 2004, OFX is supported by over 2000 banks and brokerages as well as major payroll processing companies. The latest version of OFX is 2.0.2.

In one embodiment, the historical payment data is obtained from a financial institution, such as a bank or union, using any other method for accessing the historical payment history, and allowing process for identifying recurring payments 200 to scan the data, as described below, including manual entry of the data. As noted above, in one embodiment, process for identifying recurring payments 200 is part of a parent personal financial, business financial, accounting, or tax preparation software system, program, package or application that implements a process for identifying recurring payments, such as process for identifying recurring payments 200, as one of multiple features. Some of these parent systems, have the capability to gather payment data, often using OFX, and then store the data for use by process for identifying recurring payments 200 in one of numerous locations by one of numerous methods known to those of skill in the art.

In some embodiments, the historical payment data is obtained from access to data already stored in another system or from a memory system, such as memory systems 103, 153, or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above is maintained, in whole, or in part, by: the user, or a user computing system; the financial institution; the provider of process for identifying recurring payments 200; the provider of the parent system; or any other parties.

In one embodiment, the time frame of the historical payment data, for instance, the last 90 days, is selected by the providers of process for identifying recurring payments 200 with, in one embodiment, a user edit/modify capability. In one embodiment, the time frame of the historical payment data is selected by the providers of the parent system implementing process for identifying recurring payments 200 with, in one embodiment, a user edit/modify capability. In one embodiment, the time frame of the historical payment data is selected by the user.

In one embodiment, once the historical payment data is obtained, by any means, and for any timeframe selected, the data is also saved at OBTAIN HISTORICAL PAYMENT DATA OPERATION 205. In one embodiment, the data is saved by storing the data, in whole, or in part, by any one of the numerous mechanisms known to those of skill in the art. For instance, in one embodiment, the historical payment data, in whole, or in part, is stored in a memory system, such as memory systems 103, 153, or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above is maintained, in whole, or in part, by: the user, or a user computing system; the financial institution; the provider of process for identifying recurring payments 200; the provider of the parent system; or any other parties.

As noted above, several methods for obtaining historical payment data at OBTAIN HISTORICAL PAYMENT DATA OPERATION 205 are well known to those of skill in the art. Consequently, these various methods for obtaining historical payment data are not discussed further herein to avoid detracting from the disclosure.

In one embodiment, once the historical payment data is obtained, and stored, at OBTAIN HISTORICAL PAYMENT DATA OPERATION 205, process flow proceeds to SCAN HISTORICAL PAYMENT DATA OPERATION 207. At SCAN HISTORICAL PAYMENT DATA OPERATION 207, the historical payment data from OBTAIN HISTORICAL PAYMENT DATA OPERATION 205 is scanned for potential recurring payments using, and based on, the potential recurring payment identification parameters defined and established at SET POTENTIAL RECURRING PAYMENT IDENTIFICATION PARAMETERS OPERATION 203. In one embodiment, this scanning takes place at the initial start up of process for identifying recurring payments 200, or the initial start up of the parent system implementing process for identifying recurring payments 200, and then at either automatically generated or user initiated intervals thereafter. In one embodiment, the scan of the payment data from OBTAIN HISTORICAL PAYMENT DATA OPERATION 205 for potential recurring payments using, and based on, the potential recurring payment identification parameters of SCAN HISTORICAL PAYMENT DATA OPERATION 207 begins only upon the occurrence of an event, or action, by the user, or the parent system, such as is discussed below.

FIG. 2B shows an exemplary screen shot 217B as would be displayed, in one embodiment, to a user on a display device, such as display devices 115, 165 or 125 of FIG. 1, by a parent system interface, such as user interface 305 of FIG. 3, discussed below. As seen in FIG. 2B, in one embodiment, screen shot 217B includes "options" menu 218 which, in turn, includes "Scan now for recurring transactions" icon 219. In one embodiment, options menu 218 is a pull down menu, or other GUI like device, displayed or "activated" by the user clicking on the options icon 218A or, in one embodiment, by hovering a cursor, pointer, or other user interface device component over options icon 218A, or some other portion of screen shot 217B. In one embodiment, once the options menu 218 is activated, one or more options are displayed. In one embodiment, one of the options displayed upon the activation of options menu 218 is a "Scan now for recurring transactions" icon 219. In one embodiment, Scan now for recurring transactions icon 219 is itself activated by the user clicking on the Scan now for recurring transactions icon 219 or, in one embodiment, by hovering a cursor, pointer, or other user interface device component over Scan now for recurring transactions icon 219, or some other portion of screen shot 217B. In one embodiment, it is the activation of Scan now for recurring transactions icon 219 that begins the scan of the payment data from OBTAIN HISTORICAL PAYMENT DATA OPERATION 205 for potential recurring payments using, and based on, the potential recurring payment identification parameters of SET POTENTIAL RECURRING PAYMENT IDENTIFICATION PARAMETERS OPERATION 203 at SCAN HISTORICAL PAYMENT DATA OPERATION 207.

Returning now to FIG. 2A and process for identifying recurring payments 200, once the scan of the payment data from OBTAIN HISTORICAL PAYMENT DATA OPERATION 205 for potential recurring payments using, and based on, the potential recurring payment identification parameters of SCAN HISTORICAL PAYMENT DATA OPERATION 207 is begun, by any means, process flow proceeds to IDENTIFY POTENTIAL RECURRING PAYMENTS OPERATION 209. At IDENTIFY POTENTIAL RECURRING PAYMENTS OPERATION 209, potential recurring payments are identified during the scan of the payment data from OBTAIN HISTORICAL PAYMENT DATA OPERATION 205 for potential recurring payments using, and based on, the potential recurring payment identification parameters of SCAN HISTORICAL PAYMENT DATA OPERATION 207 by comparing data associated with each payment listed in the payment data of OBTAIN HISTORICAL PAYMENT DATA OPERATION 205.

Methods, structures, and means for the scanning of data, such as the payment data from OBTAIN HISTORICAL PAYMENT DATA OPERATION 205 are well known to those of skill in the art. In one embodiment, the particular data scanned depends on the potential recurring payment identification parameters defined and established at SET POTENTIAL RECURRING PAYMENT IDENTIFICATION PARAMETERS OPERATION 203. For example, as noted above, in one embodiment multiple occurrences of the same payee in a given time period is defined as one potential recurring payment identification parameter at SET POTENTIAL RECURRING PAYMENT IDENTIFICATION PARAMETERS OPERATION 203. In this embodiment, the particular data scanned at SCAN HISTORICAL PAYMENT DATA OPERATION 207 to identify a potential recurring payment at IDENTIFY POTENTIAL RECURRING PAYMENTS OPERATION 209 is the payee portion of the payment data of OBTAIN HISTORICAL PAYMENT DATA OPERATION 205.

As another example, as noted above, in one embodiment, multiple occurrences of the same payment amount in a given time period is defined as one potential recurring payment identification parameter at SET POTENTIAL RECURRING PAYMENT IDENTIFICATION PARAMETERS OPERATION 203. In this embodiment, the particular data scanned at SCAN HISTORICAL PAYMENT DATA OPERATION 207 to identify a potential recurring payment at IDENTIFY POTENTIAL RECURRING PAYMENTS OPERATION 209 is the payment amount portion of the payment data of OBTAIN HISTORICAL PAYMENT DATA OPERATION 205.

As another example, as noted above, in one embodiment, multiple occurrences of any payment at relatively regular time intervals, such as the 15$^{th}$ of each month, in a given time period is defined as one potential recurring payment identification parameter at SET POTENTIAL RECURRING PAYMENT IDENTIFICATION PARAMETERS OPERATION 203. In this embodiment, the particular data scanned at SCAN HISTORICAL PAYMENT DATA OPERATION 207 to identify a potential recurring payment at IDENTIFY POTENTIAL RECURRING PAYMENTS OPERATION 209 is the payment date portion of the payment data of OBTAIN HISTORICAL PAYMENT DATA OPERATION 205.

As another example, as noted above, in one embodiment any payment made in selected categories, such as assigned by a user or a parent system, is defined as one potential recurring payment identification parameter at SET POTENTIAL RECURRING PAYMENT IDENTIFICATION PARAMETERS OPERATION 203. In this embodiment, the particular data scanned at SCAN HISTORICAL PAYMENT DATA OPERATION 207 to identify a potential recurring payment at IDENTIFY POTENTIAL RECURRING PAYMENTS OPERATION 209 is the transaction category portion of the payment data of OBTAIN HISTORICAL PAYMENT DATA OPERATION 205.

As another example, as noted above, in one embodiment any payment made to specified merchants or service providers can be pre-programmed as one potential recurring payment identification parameter at SET POTENTIAL RECURRING PAYMENT IDENTIFICATION PARAMETERS OPERATION 203. In this embodiment, the particular data scanned at SCAN HISTORICAL PAYMENT DATA OPERATION 207 to identify a potential recurring payment at IDENTIFY POTENTIAL RECURRING PAYMENTS OPERATION 209 is the payee portion of the payment data of OBTAIN HISTORICAL PAYMENT DATA OPERATION 205.

As also noted above, in one embodiment, any combination of the potential recurring payment identification parameters discussed above can be made to create a specific potential recurring payment identification parameters set at SET POTENTIAL RECURRING PAYMENT IDENTIFICATION PARAMETERS OPERATION 203. In these embodiments, multiple data fields of the data of OBTAIN HISTORICAL PAYMENT DATA OPERATION 205 are scanned at SCAN HISTORICAL PAYMENT DATA OPERATION 207 to identify a potential recurring payment at IDENTIFY POTENTIAL RECURRING PAYMENTS OPERATION 209 and the results are combined into the desired sets of data and results by a multiplexing, or other multi-variable/multi-result, operations that provide for multi-variable analysis and results.

As noted above, methods, structures, and means for the scanning of data, such as the payment data from OBTAIN HISTORICAL PAYMENT DATA OPERATION 205, are well known to those of skill in the art and comparing scanned data with parameters data is well know to those of skill in the art, as are multiplexing and combinational results operations. Consequently, these structures, means, and methods are not discussed further herein to avoid detracting from the description.

Once the payment data of OBTAIN HISTORICAL PAYMENT DATA OPERATION 205 is scanned at SCAN HISTORICAL PAYMENT DATA OPERATION 207 to identify a potential recurring payments at IDENTIFY POTENTIAL RECURRING PAYMENTS OPERATION 209 using the potential recurring payment identification parameters established at SET POTENTIAL RECURRING PAYMENT IDENTIFICATION PARAMETERS OPERATION 203, the data indicating the potential recurring payments is stored at IDENTIFY POTENTIAL RECURRING PAYMENTS OPERATION 209. In one embodiment, the data is saved by storing the data, in whole, or in part, by any one of the numerous mechanisms known to those of skill in the art. For instance, in one embodiment, the historical payment data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above is maintained, in whole, or in part, by: the user, or a user computing system; the financial institution; the provider of process for identifying recurring payments 200; the provider of the parent system; or any other parties.

Once the payment data of OBTAIN HISTORICAL PAYMENT DATA OPERATION 205 is scanned at SCAN HISTORICAL PAYMENT DATA OPERATION 207 to identify potential recurring payments at IDENTIFY POTENTIAL RECURRING PAYMENTS OPERATION 209, using the potential recurring payment identification parameters set at SET POTENTIAL RECURRING PAYMENT IDENTIFICATION PARAMETERS OPERATION 203, and the potential recurring payments are identified and the data is stored at IDENTIFY POTENTIAL RECURRING PAYMENTS OPERATION 209, process flow proceeds to GENERATE AND DISPLAY POTENTIAL RECURRING PAYMENTS REPORT OPERATION 211.

Figure 3:
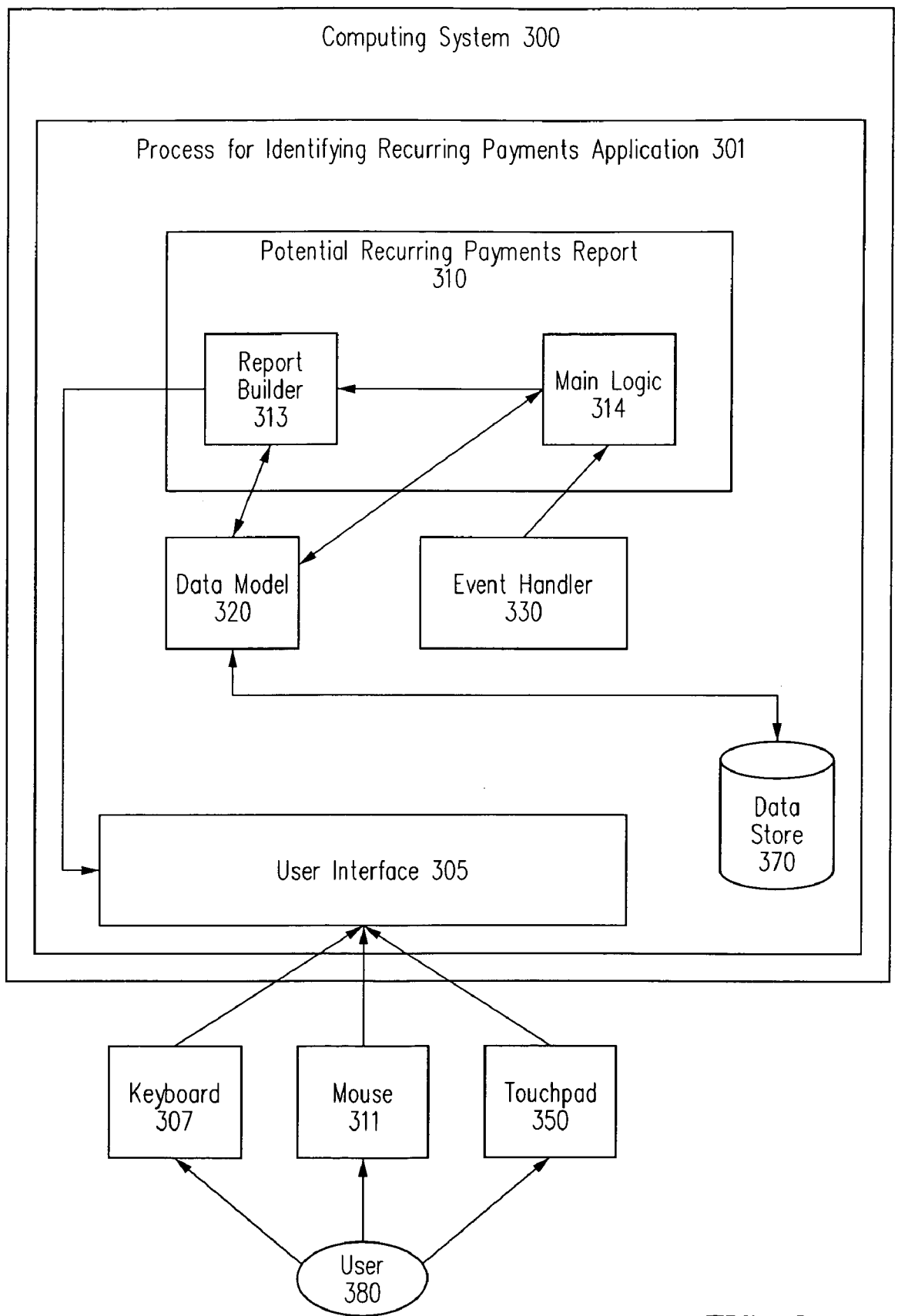
FIG. 3 is a block diagram of an exemplary software architecture for implementing one embodiment.

At GENERATE AND DISPLAY POTENTIAL RECURRING PAYMENTS REPORT OPERATION 211, the potential recurring payments identified and stored at IDENTIFY POTENTIAL RECURRING PAYMENTS OPERATION 209 are organized and a potential recurring payments report listing the potential recurring payments identified and stored at IDENTIFY POTENTIAL RECURRING PAYMENTS OPERATION 209 is generated and displayed to a user on a display device, such as display devices 115, 165 or 125 of FIG. 1, by a parent system interface, such as user interface 305 of FIG. 3.

FIG. 2C shows an exemplary screen shot 221C as would be displayed, in one embodiment, to a user on a display device, such as display devices 115, 165 or 125 of FIG. 1, by a parent system interface, such as user interface 305 of FIG. 3, discussed below. As seen in FIG. 2C, in one embodiment, screen shot 221C includes potential recurring payments report 229. In one embodiment, all of the potential recurring payments identified and stored at IDENTIFY POTENTIAL RECURRING PAYMENTS OPERATION 209 are listed and displayed in potential recurring payments report 229.

In one embodiment, potential recurring payments report 229 includes payee list 224 including text describing a payee, or category, for each potential recurring payment identified and stored at IDENTIFY POTENTIAL RECURRING PAYMENTS OPERATION 209. In one embodiment, such as an embodiment that includes the multiple occurrences of payments to the same payee or payments to specified merchants or service providers as a potential recurring payee identification parameter, the text identifies the payee, such as potential recurring payment Mortgage 227A of potential recurring payment 227 of payee list 224. In other embodiments, particularly those embodiments that include any payment made in selected categories as a potential recurring payee identification parameter, the text in payee list 224 identifies the category of the payment (not shown).

In one embodiment, potential recurring payments report 229 includes amount column 225 that lists a monetary amount corresponding to the last payment made for each potential recurring payment listed in payee list 224. For example, for potential recurring payment Mortgage 227A, the corresponding amount of 1,954.00 is displayed in amount column 225. In one embodiment, potential recurring payments report 229 includes date column 222 where a projected date for the next payment of each of the potential recurring payments listed in payee list 224 of potential recurring payments report 229 is displayed. For example, for potential recurring payment Mortgage 227A, the corresponding projected date for the next payment is Feb. 28, 2006 is displayed in date column 222.

Returning now to FIG. 2A and process for identifying recurring payments 200, once potential recurring payments report 229 is generated and displayed at GENERATE AND DISPLAY POTENTIAL RECURRING PAYMENTS REPORT OPERATION 211, process flow proceeds to either optional AUTOMATICALLY CONFIRM ALL POTENTIAL RECURRING PAYMENTS OPERATION 212 or optional MANUALLY CONFIRM RECURRING PAYMENTS OPERATION 213.

In one embodiment, at optional AUTOMATICALLY CONFIRM ALL POTENTIAL RECURRING PAYMENTS OPERATION 212, all potential recurring payments listed in payee list 224 of potential recurring payments report 229 are confirmed automatically as valid recurring payments. In one embodiment, at AUTOMATICALLY CONFIRM ALL POTENTIAL RECURRING PAYMENTS OPERATION 212, the results from potential recurring payments report 229, including payee list 224, the associated amounts from amount column 225, and the projected payment dates of date column 222, are used to automatically schedule the payments of payee list 224 of potential recurring payments report 229 for the corresponding amounts shown in amount column 225 on the projected dates of date column 222. In one embodiment, process flow then proceeds to EXIT OPERATION 219, where process for identifying recurring payments 200 is, in this embodiment, exited.

In one embodiment, once potential recurring payments report 229 is generated and displayed at GENERATE AND DISPLAY POTENTIAL RECURRING PAYMENTS REPORT OPERATION 211, process flow proceeds to optional MANUALLY CONFIRM RECURRING PAYMENTS OPERATION 213.

At MANUALLY CONFIRM RECURRING PAYMENTS OPERATION 213, according to one embodiment, the user is given an opportunity to review and manually confirm, or validate, each of the potential recurring payments identified at IDENTIFY POTENTIAL RECURRING PAYMENTS OPERATION 209. Returning now to FIG. 2C, in one embodiment, potential recurring payments report 229 includes confirmation column 226 including, in one embodiment, a "YES", or confirmed, icon 226A and a "NO", or not confirmed, icon 226B for each potential recurring payment listed in payee list 224. In one embodiment, a user confirms or designates an individual potential recurring payment listed in payee list 224, such as potential recurring payment 227, as a valid recurring payment by activating the associated YES icon 226A, such as YES icon 227Y of potential recurring payment Mortgage 227A. In one embodiment, a user denies an individual potential recurring payment listed in payee list 224, such as potential recurring payment 227, valid recurring payment status by activating the associated NO icon 226B, such as NO icon 227N of potential recurring payment Mortgage 227A. In one embodiment, YES or NO icons 226A, 226B are "activated" by the user clicking on the respective YES or NO icons 226A, 226B or, in one embodiment, by hovering a cursor, pointer, or other user interface device component over YES or NO icons 226A, 226B, or some other portion of screen shot 221C.

In one embodiment, once a potential recurring payment listed in payee list 224 is denied the status of valid recurring payment, by activating the associated NO icon 226B, the now invalid recurring payment is dropped from payee list 224 and potential recurring payments report 229.

Returning now to FIG. 2A, once each of the potential recurring payments of payee list 224 of potential recurring payments report 229 is either validated or invalidated as a recurring payment at MANUALLY CONFIRM RECURRING PAYMENTS OPERATION 213, process flow proceeds to SAVE CONFIRMED RECURRING PAYMENT TRANSACTION DATA OPERATION 215. In one embodiment, at SAVE CONFIRMED RECURRING PAYMENT TRANSACTION DATA OPERATION 215, the data associated with the now validated recurring payments, including payee name, payee address, account number, and all the data shown in potential recurring payments report 229 is saved, thereby eliminating the need for the user to manually enter this data. In one embodiment, the data shown in potential recurring payments report 229 is user editable. For instance, in one embodiment, the projected dates of date column 222 is made user editable as is the amount shown amount column 225.

In one embodiment, the data associated with the validated recurring payments is saved at SAVE CONFIRMED RECURRING PAYMENT TRANSACTION DATA OPERATION 215 using methods and structures well known to those of skill in the art. For instance, in one embodiment, the historical payment data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above is maintained, in whole, or in part, by: the user, or a user computing system; the financial institution; the provider of process for identifying recurring payments 200; the provider of the parent system; or any other parties.

In one embodiment, once the data associated with the now validated recurring payments, including, in one embodiment, payee name, payee address, account number, and all the data shown in potential recurring payments report 229, is saved at SAVE CONFIRMED RECURRING PAYMENT TRANSACTION DATA OPERATION 215, process flow proceeds to SET USER SELECTED RECURRING PAYMENT ACTION OPERATION 217. In one embodiment, at SET USER SELECTED RECURRING PAYMENT ACTION OPERATION 217, the user can select one of several options for using the recurring payment information in potential recurring payments report 229 (FIG. 2C) of GENERATE AND DISPLAY POTENTIAL RECURRING PAYMENTS REPORT OPERATION 211 (FIG. 2A).

In one embodiment, at SET USER SELECTED RECURRING PAYMENT ACTION OPERATION 217, the user may allow the results from potential recurring payments report 229, including payee list 224, the associated amounts from amount column 225, and the projected payment dates of date column 222, to be used to automatically schedule the validated recurring payments of payee list 224 for the amounts shown in amount column 225 on the projected dates of date column 222.

In one embodiment, at SET USER SELECTED RECURRING PAYMENT ACTION OPERATION 217, the user may elect to have reminders (not shown) generated on or about the projected payment dates of date column 222. In one embodiment, this reminder takes the form of a pop-up screen, or other visual and/or audio reminder, on a display device, such as display devices 115, 165, 125 of FIG. 1. In one embodiment, the reminder generated requires a positive action/acknowledgement such as a check box (not shown) being selected by the user before the reminder screen (not shown) can be closed or otherwise terminated. In one embodiment, the reminder generated is in the form of an E-mail or a computer telephony message or even an automatically generated phone call or letter. In one embodiment, the reminder generated is sent to a portable computer, a workstation, a two-way pager, a cellular telephone, a smart phone, a digital wireless telephone, a personal digital assistant, a server computer, an Internet appliance, or any other device capable of displaying a video and/or audio reminder to the user.

In one embodiment, once the user selects an option for using the recurring payment information in potential recurring payments report 229 (FIG. 2C) of GENERATE AND DISPLAY POTENTIAL RECURRING PAYMENTS REPORT OPERATION 211 (FIG. 2A) at SET USER SELECTED RECURRING PAYMENT ACTION OPERATION 217, process flow then proceeds to EXIT OPERATION 219, where process for identifying recurring payments 200 is, in this embodiment, exited.

In one embodiment, the various data discussed above associated with, and/or generated by: SET POTENTIAL RECURRING PAYMENT IDENTIFICATION PARAMETERS OPERATION 203; OBTAIN HISTORICAL PAYMENT DATA OPERATION 205; SCAN HISTORICAL PAYMENT DATA OPERATION 207; IDENTIFY POTENTIAL RECURRING PAYMENTS OPERATION 209; GENERATE AND DISPLAY POTENTIAL RECURRING PAYMENTS REPORT OPERATION 211; AUTOMATICALLY CONFIRM ALL POTENTIAL RECURRING PAYMENTS OPERATION 212; MANUALLY CONFIRM RECURRING PAYMENTS OPERATION 213; SAVE CONFIRMED RECURRING PAYMENT TRANSACTION DATA OPERATION 215; SET USER SELECTED RECURRING PAYMENT ACTION OPERATION 217, and all associated screen data for screen shot 217B and screen shot 221C is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing system, such as computing systems 100, 151, described above. In one embodiment, the data, in whole, or in part, is stored in any computing system and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above is maintained, in whole, or in part, by: the user, or a user computing system; the financial institution; the provider of process for identifying recurring payments 200; the provider of the parent system; or any other parties.

Software System Architecture

FIG. 3 shows one embodiment of a software architecture. Shown in FIG. 3 is a computing system 300. In one embodiment, computing system 300 is similar to computing systems 100 and 150 of FIG. 1 discussed above.

In some embodiments, computing system 300 is a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system. In addition, embodiments of computing system 300 can be devices other than a conventional computing system such as, for example, a personal digital assistant, a cell phone, and/or computer devices in which one or more computing resources are located remotely and accessed via a network.

Computing system 300 includes a process for identifying recurring payments application 301. In one embodiment, all, or part, of process for identifying recurring payments application 301 resides in a memory system 303, such as memory systems 103, 153 or server memory system 123, or database 170, of FIG. 1, or in a cache memory, such as cache memory 103A or 153A of FIG. 1, or in any main memory and mass memory, associated with a computing system, such as computing system 300, or computing systems 100 and 150 described above. In one embodiment, all, or part, of a process for identifying recurring payments application 301 resides in any computing system and/or server system, such as computing systems 300, 100, 150, or server system 120, or other device, in another location, or on/in a computer readable medium, and/or any other computer program product, as defined herein. In one embodiment, all, or part, of a process for identifying recurring payments application 301 resides in a webpage or in a web-based system. Embodiments of a process for identifying recurring payments application 301 may be included as add-on software for existing software programs, packages, or applications, and embodiments may be a feature of an application that is bundled with a computing system or sold separately. Some embodiments may also be implemented as functionality embedded in hardware devices and systems.

As shown in FIG. 3, in one embodiment, process for identifying recurring payments application 301 includes: potential recurring payments report module 310, including report builder 313 and main logic 314; data model module 320; event handler 330; data store 370; and user interface 305.

In one embodiment, user interface devices such as keyboard 307, mouse 311, and touchpad 350 are operatively coupled to user interface 305, and process for identifying recurring payments application 301. User interface devices 307, 311 and 350 and user interface 305, provide a user 380 with an interface to process for identifying recurring payments application 301.

In one embodiment, data store 370 is operatively coupled to data model module 320 of process for identifying recurring payments application 301. In one embodiment, data store 370 is a memory system, such as memory systems 103, 153, or server memory system 123, or database 170, of FIG. 1, or a cache memory, such as cache memory 103A or 153A of FIG. 1, or any main memory or mass memory associated with a computing system, such as computing systems 100 and 150 described above. In one embodiment, database 370 is a designated server system or computing system, or a designated portion of a server system or computing system, such as systems 100, 150 and 120. In one embodiment, database 370 is a dedicated mass storage device implemented in software, hardware, or a combination of hardware and software. In one embodiment, data store 370 a webpage or a web-based system.

In one embodiment, process for identifying recurring payments application 301 includes a number of executable code portions (not shown) and data files (not shown). These include code for creating and supporting a user interface, such as user interface 305, as well as for generating displays and potential recurring payment lists, such as payee list 224 (FIG. 2C). In one embodiment, process for identifying recurring payments application 301 (FIG. 3) is responsible for orchestrating the operation of a process for identifying recurring payments, such as process for identifying recurring payments 200, discussed above (FIG. 2A). As discussed above, process for identifying recurring payments application 301 (FIG. 3) includes potential recurring payments report module 310, which, in turn, includes display builder 313 and main logic 314.

Potential recurring payments report module 310, report builder 313, and main logic 314 need not be discrete software modules. The particular software architecture of FIG. 3 is shown merely for illustrative purposes. Consequently, those of skill in the art will recognize that other configurations are contemplated by, and are within the scope of, the present invention and the invention may be practiced and implemented using numerous other architectures and in numerous other environments.

In one embodiment, data store 370 includes data created by user 380, a parent system, and process for identifying recurring payments application 301 such the potential recurring payment identification parameters and limits data from SET POTENTIAL RECURRING PAYMENT IDENTIFICATION PARAMETERS OPERATION 203 (FIG. 2A), the historical payment data of OBTAIN HISTORICAL PAYMENT DATA OPERATION 205, or any of the other data described above with respect to a process for identifying recurring payments, such as process for identifying recurring payments 200 (FIG. 2A) or screen shots 217B (FIG. 2B) and 221C (FIG. 2C).

In one embodiment, potential recurring payments report module 310 (FIG. 3) includes various components that operate together to implement process for identifying recurring payments application 301. In one embodiment, user interface 305 displays information, such as is included in a process for identifying recurring payments, as discussed above, with respect to FIGS. 2A, 2B, and 2C, on a user's display device, such as display devices 115, 165 and 125, discussed above with respect to FIG. 1.

In one embodiment, event handler module 330 (FIG. 3) detects user interaction with any of the user interface devices such as keyboard 307, mouse 311, and touchpad 350 and notifies the other components of the interaction. In one embodiment, main logic module 314 orchestrates recurring payment list 224 (FIG. 2C) generation including requesting data from, and sending data to, other components of potential recurring payments report module 310 (FIG. 3). In one embodiment, report builder 313 accepts as input data the parameters specifying what data, such as, for example: payment amount, and limits; payment dates, and limits; and/or payee. In one embodiment, report builder 313 then obtains the relevant potential recurring payment data.

In one embodiment, based on these parameters and data, report builder 313 then creates a potential recurring payment list for display on a user interface 305. In one embodiment, data model module 320 retrieves the underlying transaction data from data store 370 and provides the data to the other components, such as report builder 313.

As noted above, the architecture of FIG. 3 represents but one possible implementation of process for identifying recurring payments application 301 and other embodiments, such as one in which the elements of the invention are implemented on a computing system other than the user's computing system, or one with different components and/or organization, interconnection and operational relation, are equally possible and will be readily apparent to one of skill in the art.

Figure 4:
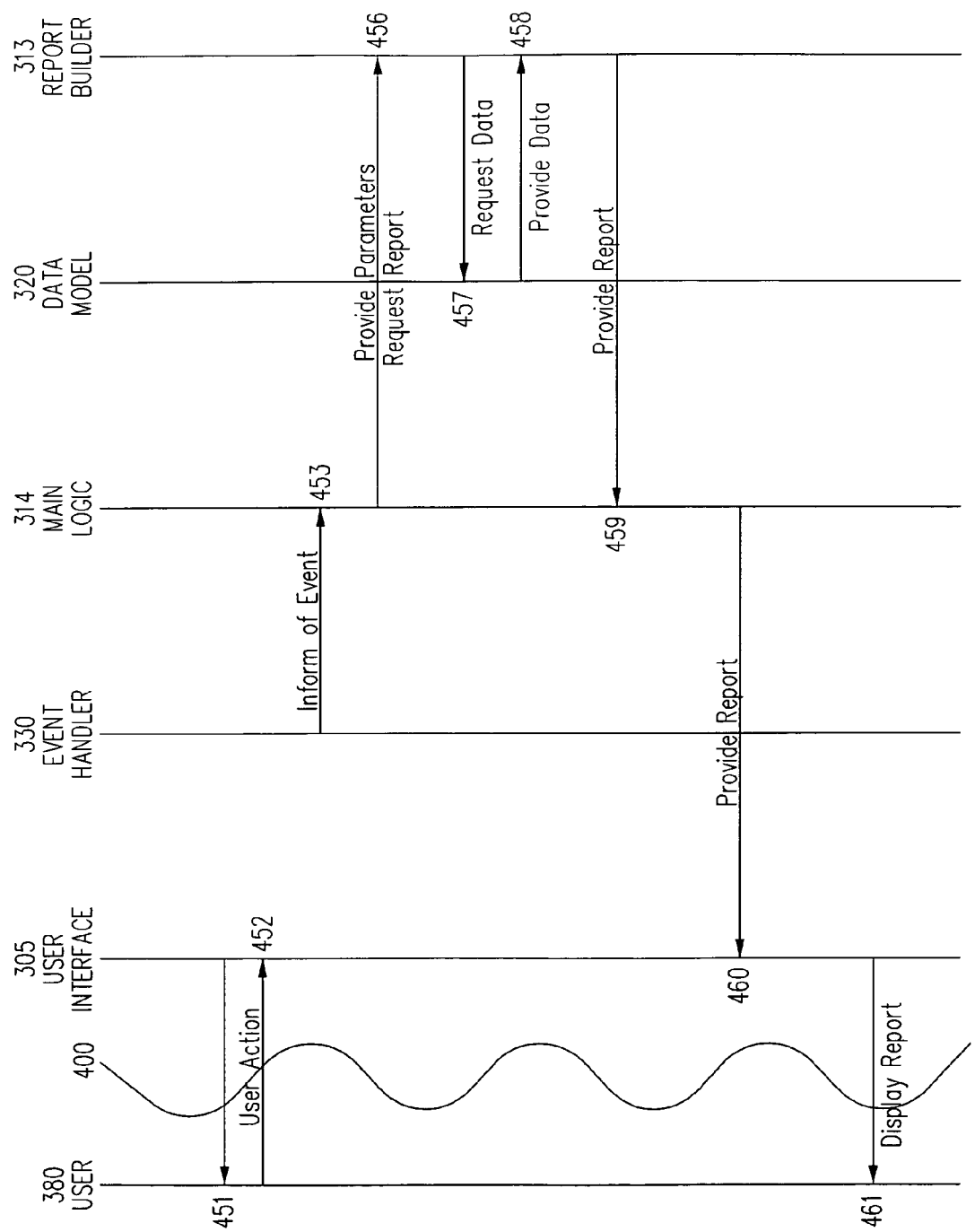
FIG. 4 is an interaction diagram depicting a sequence of events that takes place when a report of potential recurring payments is generated and displayed according to one embodiment.

FIG. 4 is an interaction diagram illustrating interactions among system components according to one embodiment. User-system boundary 400 represents the division between the user 380 of the contextual budgeting application, such as process for identifying recurring payments application 301, to the left of user-system boundary 400, and the components of the process for identifying recurring payments application, such as process for identifying recurring payments application 301, to the right of user-system boundary 400.

Viewing FIGS. 3 and 4 together, user interface 305 displays the appropriate interface to user 380 at 451. User 380 takes an action at 452 which is interpreted by user interface 305. Any number of interactions between user 380 and user interface 305 may occur such as user 380 clicking on Scan now for recurring transactions icon 219 of FIG. 2C, or options icon 218A of FIG. 2B, or, in one embodiment, by hovering a cursor, pointer, or other user interface device component over Scan now for recurring transactions icon 219 of FIG. 2C or options icon 218A of FIG. 2B, or some other designated portion of screen shots 217B or 221C described above.

Returning to FIG. 4, when user 380 performs an action at 452 causing a potential recurring payments report, such as potential recurring payments report 229 of FIG. 2C, to be generated and displayed, event handler module 330 (FIGS. 3 and 4) informs main logic 314 at 453 of the occurrence of the user initiated event. Main logic 314 then determines the report parameters based on the user initiated event. Main logic 314 then sends a request to report builder 313 at 456 for the potential recurring payments report, such as potential recurring payments report 229 of FIG. 2C. In one embodiment at 456 (FIG. 4) the request includes the appropriate potential recurring payments report parameters.

Report builder 313 requests any needed data, and data model module 320 then retrieves the requested data from data store 370 and provides the data to report builder 313 at 458. Based on this data, and the parameters provided within the potential recurring payments report request, report builder 313 creates a potential recurring payments report, such as potential recurring payments report 229 (FIG. 2C), and provides the potential recurring payments report to Main logic 314 at 459 (FIGS. 3 and 4). Finally Main logic 314 sends a request to user interface 305 to display the potential recurring payments report to user 380 at 460, and the potential recurring payments report is displayed at 461.

It will be apparent to those of skill in the art that the conceptual components of FIGS. 3 and 4, and the relationships shown and discussed, represent one possible means of implementing the invention. One skilled in the art will also recognize that other arrangements and combinations of components, both physical and conceptual, can also be used to implement other embodiments, without departing from the essential characteristics of the invention.

Embodiments of the method and apparatus for identifying recurring payments described herein, allow a user to identify recurring payments easily and to minimize his or her need to manually identify and enter recurring payment data into a computer implemented financial management system, thereby making it easier to start to use, and continue to use, a computer implemented financial management system incorporating the method and apparatus for identifying recurring payments described herein.

In addition, as discussed in more detail above, using the embodiments described above, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description may present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "determining" or "displaying" or "scanning", "comparing", refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus for performing the operations described herein. This apparatus may be specifically constructed for the required purposes, or the apparatus can comprise a general purpose system selectively activated or configured/re-configured by a computer program stored on a computer program product, as defined herein, that can be accessed by a computing system or other device.

As discussed above, herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network or other media or methods capable of delivering computer readable data representing computer readable code. This medium may belong to a computing system. However, the medium also may be removed from the computing system.

Those of skill in the art will readily recognize that the algorithms and/or operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a network, such as a LAN, WAN, or the Internet, or other network capable of allowing communication between two or more computing systems.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

Those of skill in the art will readily recognize that the particular operations, and the order of performing those operations, shown above for a process for identifying recurring payments, such as process for identifying recurring payments 200, were chosen for illustrative purposes only and that a process for identifying recurring payments, such as process for identifying recurring payments 200, described above, can be implemented with a lesser number or greater number of operations in a given embodiment, and that those operations can be performed in any logical order desired, based on the needs of the user.

In addition, the operations shown in the FIG.s for a process for identifying recurring payments, such as process for identifying recurring payments 200, discussed above, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer implemented method for identifying recurring payments comprising:
    obtaining historical payment data associated with a user for a selected time period;
    defining at least one potential recurring payment identification parameter for identifying potential recurring payments;
    using a processor to analyze the historical payment data associated with the user to attempt to identify potential recurring payments in the historical payment data based on the at least one potential recurring payment identification parameter;
    identifying potential recurring payments in the historical payment data; and
    generating a potential recurring payments report, the potential recurring payments report comprising a list of the identified potential recurring payments.

2. The computer implemented method for identifying recurring payments of claim 1, wherein:
    the at least one potential recurring payment identification parameter comprises two or more occurrences of a payment being made to a same payee.

3. The computer implemented method for identifying recurring payments of claim 1, wherein:
    the at least one potential recurring payment identification parameter comprises two or more occurrences of a same payment amount.

4. The computer implemented method for identifying recurring payments of claim 1, wherein:
    the at least one potential recurring payment identification parameter comprises one or more occurrences of a same interval of time between two payments.

5. The computer implemented method for identifying recurring payments of claim 1, wherein:
    the at least one potential recurring payment identification parameter comprises a payment made to a payee in a designated transaction category.

6. The computer implemented method for identifying recurring payments of claim 1, wherein:
    the at least one potential recurring payment identification parameter comprises a payment made to a designated payee.

7. The computer implemented method for identifying recurring payments of claim 1, further comprising:
    confirming at least one of the identified potential recurring payments of the list of the identified potential recurring payments of the potential recurring payments report by a user action.

8. The computer implemented method for identifying recurring payments of claim 7, wherein:
    the at least one potential recurring payment identification parameter comprises two or more occurrences of a payment being made to a same payee.

9. The computer implemented method for identifying recurring payments of claim 7, wherein:
    the at least one potential recurring payment identification parameter comprises two or more occurrences of a same payment amount.

10. The computer implemented method for identifying recurring payments of claim 7, wherein:
    the at least one potential recurring payment identification parameter comprises one or more occurrences of a same interval of time between two payments.

11. The computer implemented method for identifying recurring payments of claim 7, wherein:
    the at least one potential recurring payment identification parameter comprises a payment made to a payee in a designated transaction category.

12. The computer implemented method for identifying recurring payments of claim 1, further comprising:
    confirming at least one of the identified potential recurring payments of the list of the identified potential recurring payments of the potential recurring payments report automatically.

13. The computer implemented method for identifying recurring payments of claim 12, wherein:
    the at least one potential recurring payment identification parameter comprises two or more occurrences of a payment being made to a same payee.

14. The computer implemented method for identifying recurring payments of claim 12, wherein:
    the at least one potential recurring payment identification parameter comprises two or more occurrences of a same payment amount.

15. The computer implemented method for identifying recurring payments of claim 12, wherein:
    the at least one potential recurring payment identification parameter comprises one or more occurrences of a same interval of time between two payments.

16. The computer implemented method for identifying recurring payments of claim 12, wherein:
    the at least one potential recurring payment identification parameter comprises a payment made to a payee in a designated transaction category.

17. A computer program product for identifying recurring payments comprising:
- a computer readable medium;
- and computer program code, encoded on the computer readable medium, comprising computer readable instructions for:
- obtaining historical payment data associated with a user for a selected time period;
- defining at least one potential recurring payment identification parameter for identifying potential recurring payments;
- directing a processor to analyze the historical payment data associated with the user to attempt to identify potential recurring payments in the historical payment data based on the at least one potential recurring payment identification parameter;
- identifying potential recurring payments in the historical payment data; and
- generating a potential recurring payments report, the potential recurring payments report comprising a list of the identified potential recurring payments.

18. The computer program product for identifying recurring payments of claim 17, wherein:
the at least one potential recurring payment identification parameter comprises two or more occurrences of a payment being made to a same payee.

19. The computer program product for identifying recurring payments of claim 17, wherein:
the at least one potential recurring payment identification parameter comprises two or more occurrences of a same payment amount.

20. The computer program product for identifying recurring payments of claim 17, wherein:
the at least one potential recurring payment identification parameter comprises one or more occurrences of a same interval of time between two payments.

21. The computer program product for identifying recurring payments of claim 17, wherein:
the at least one potential recurring payment identification parameter comprises a payment made to a payee in a designated transaction category.

22. The computer program product for identifying recurring payments of claim 17, wherein:
the at least one potential recurring payment identification parameter comprises a payment made to a designated payee.

23. The computer program product for identifying recurring payments of claim 17, further comprising:
- computer program code, encoded on the computer readable medium, comprising computer readable instructions for:
- confirming at least one of the identified potential recurring payments of the list of the identified potential recurring payments of the potential recurring payments report by a user action.

24. The computer program product for identifying recurring payments of claim 17, further comprising:
- computer program code, encoded on the computer readable medium, comprising computer readable instructions for:
- confirming at least one of the identified potential recurring payments of the list of the identified potential recurring payments of the potential recurring payments report automatically.

25. A system for identifying recurring payments comprising:
- a memory having stored therein a process for identifying recurring payments application; and
- a processor coupled to the memory, wherein execution of the process for identifying recurring payments application generates a method comprising:
- obtaining historical payment data associated with a user for a selected time period;
- defining at least one potential recurring payment identification parameter for identifying potential recurring payments;
- using a processor to analyze the historical payment data associated with the user to attempt to identify potential recurring payments in the historical payment data based on the at least one potential recurring payment identification parameter;
- identifying potential recurring payments in the historical payment data; and
- generating a potential recurring payments report, the potential recurring payments report comprising a list of the identified potential recurring payments.

26. The system for identifying recurring payments of claim 25, wherein:
the at least one potential recurring payment identification parameter comprises two or more occurrences of a payment being made to a same payee.

27. The system for identifying recurring payments of claim 25, wherein:
the at least one potential recurring payment identification parameter comprises two or more occurrences of a same payment amount.

28. The system for identifying recurring payments of claim 25, wherein:
the at least one potential recurring payment identification parameter comprises one or more occurrences of a same interval of time between two payments.

29. The system for identifying recurring payments of claim 25, wherein:
the at least one potential recurring payment identification parameter comprises a payment made to a payee in a designated transaction category.

30. The system for identifying recurring payments of claim 25, wherein:
the at least one potential recurring payment identification parameter comprises a payment made to a designated payee.

31. The system for identifying recurring payments of claim 25, wherein;
execution of the process for identifying recurring payments application generates a method further comprising:
confirming at least one of the identified potential recurring payments of the list of the identified potential recurring payments of the potential recurring payments report by a user action.

32. The system for identifying recurring payments of claim 25, wherein;
execution of the process for identifying recurring payments application generates a method further comprising:
confirming at least one of the identified potential recurring payments of the list of the identified potential recurring payments of the potential recurring payments report automatically.

* * * * *